(12) United States Patent
Eaton

(10) Patent No.: US 8,131,329 B2
(45) Date of Patent: Mar. 6, 2012

(54) DISTRIBUTED MODE SPEAKER FOR MOBILE DEVICES

(75) Inventor: William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 958 days.

(21) Appl. No.: 11/774,103

(22) Filed: Jul. 6, 2007

(65) Prior Publication Data

US 2009/0011805 A1    Jan. 8, 2009

(51) Int. Cl.
*H04M 1/00* (2006.01)
(52) U.S. Cl. .......... 455/575.4; 455/575.1; 455/550.1; 455/575.8
(58) Field of Classification Search .... 455/550.1–575.9; 381/306, 311, 333, 388
See application file for complete search history.

(56) References Cited

U.S. PATENT DOCUMENTS

| | | | |
|---|---|---|---|
| 6,307,942 B1 * | 10/2001 | Azima et al. | 381/152 |
| 6,985,596 B2 * | 1/2006 | Bank et al. | 381/152 |
| 7,151,837 B2 * | 12/2006 | Bank et al. | 381/190 |
| 7,369,882 B2 * | 5/2008 | Hwang et al. | 455/575.1 |
| 7,590,436 B2 * | 9/2009 | Hulskemper | 455/575.4 |
| 7,639,826 B1 * | 12/2009 | Azima et al. | 381/152 |
| 2002/0127976 A1 * | 9/2002 | Liu | 455/90 |
| 2002/0193137 A1 * | 12/2002 | Bank et al. | 455/550 |
| 2003/0007653 A1 * | 1/2003 | Azima et al. | 381/152 |
| 2005/0090298 A1 * | 4/2005 | Park et al. | 455/575.4 |
| 2006/0023898 A1 * | 2/2006 | Katz | 381/98 |
| 2006/0093133 A1 * | 5/2006 | Park et al. | 379/433.12 |
| 2007/0091582 A1 | 4/2007 | Ku et al. | |
| 2007/0105606 A1 * | 5/2007 | Yoon et al. | 455/575.4 |
| 2007/0161418 A1 * | 7/2007 | Chen et al. | 455/575.4 |
| 2007/0275773 A1 * | 11/2007 | Joung et al. | 455/575.1 |
| 2008/0063225 A1 * | 3/2008 | Choi | 381/305 |
| 2009/0104950 A1 * | 4/2009 | Huang | 455/575.4 |
| 2010/0016042 A1 * | 1/2010 | Shim et al. | 455/575.4 |

FOREIGN PATENT DOCUMENTS

| | | |
|---|---|---|
| EP | 1301012 A1 | 4/2003 |
| JP | 2003-219005 A | 7/2003 |
| JP | 2006-067084 A | 3/2006 |
| JP | 2006-157199 A | 6/2006 |
| WO | 02/104065 A2 | 12/2002 |
| WO | 2004/054317 A1 | 6/2004 |
| WO | 2007/045908 A1 | 4/2007 |
| WO | 2007060730 A1 | 5/2007 |

OTHER PUBLICATIONS

PCT—International Search Report dated Nov. 5, 2008, for Application No. PCT/US2008/057396, Filed Mar. 19, 2008.
Notice of Preliminary Rejection issued Oct. 4, 2011 in re Korean Application No. 2010-7002667.

* cited by examiner

*Primary Examiner* — Kent Chang
*Assistant Examiner* — Ronald Eisner
(74) *Attorney, Agent, or Firm* — Coats & Bennett, P.L.L.C.

(57) ABSTRACT

A mobile communication device includes first and second housing sections movably connected so as to move relative to one another between open and closed positions. The first and second housing sections each include protected surfaces that overlap when the first and second housing sections are in the open position. A distributed mode speaker is disposed on one of the protected surfaces to protect the distributed mode speaker from damage.

13 Claims, 3 Drawing Sheets

DISTRIBUTED MODE SPEAKER FOR MOBILE DEVICES

BACKGROUND

The present invention relates generally to speakers for mobile communication devices, and more particularly to distributed mode speakers for mobile communication devices.

Distributed-mode loudspeakers (DMLs) are a type of loudspeaker known in the art, and were developed by New Transducers Limited (NXT®). DMLs comprise a thin but stiff speaker panel excited by a transducer. Like conventional pistonic loudspeakers, DMLs convert electrical audio signals to audible sounds that can be heard by a user. However, a fundamental difference between pistonic speakers and DMLs is in the way that DMLs generate and radiate sound energy. In DMLs, audio signals drive the transducer to excite the natural resonant modal structure of the panel. This excitation vibrates the panel in a pseudo-random manner such that different areas of the panel are independently excited with different amplitudes and phases. In other words, the DML panel actually "bends" according to the various frequencies of the vibration. These "bending waves" produce wideband acoustical output over a wide range of frequencies. DMLs eliminate the need for bulky enclosures, multiple drivers, crossovers, and other parts that are necessary in conventional pistonic speaker designs. These attributes make DMLs an attractive choice for use as a speaker in many consumer electronics devices.

Despite their advantages, DMLs have not gained widespread acceptance for use in mobile devices. One drawback is the DML's lack of robustness. DMLs require a relatively large area that makes them more susceptible to damage than other speaker designs. Speakers for mobile devices should be expected to withstand a certain amount of impact or shock when the mobile devices are dropped or hit against another object. Accordingly, there is a need for a more robust design for distributed mode speakers for use in mobile devices.

SUMMARY

The present invention comprises a mobile communication device including a distributed mode speaker. In one exemplary embodiment, the mobile communication device comprises first and second housing sections that move (e.g. slide or pivot) relative to one another between open and closed positions. In the open position, the first and second housing sections partially overlap to form protected surfaces that are not exposed in the open position. One of the protected surfaces is on the obverse side of the first housing section and one protected surface is on the reverse side of the second housing section. A distributed mode speaker is located on the protected surface of one of the first and second housing sections.

In another exemplary embodiment, a distributed mode speaker for a mobile communication device functions as both a speaker and a vibratory alarm. The distributed mode speaker includes a speaker panel, a mode transducer to generate bending waves in the speaker panel to generate audible sounds and a vibration transducer to vibrate said speaker panel to generate a tactile alarm.

DETAILED DESCRIPTION

Figure 1:
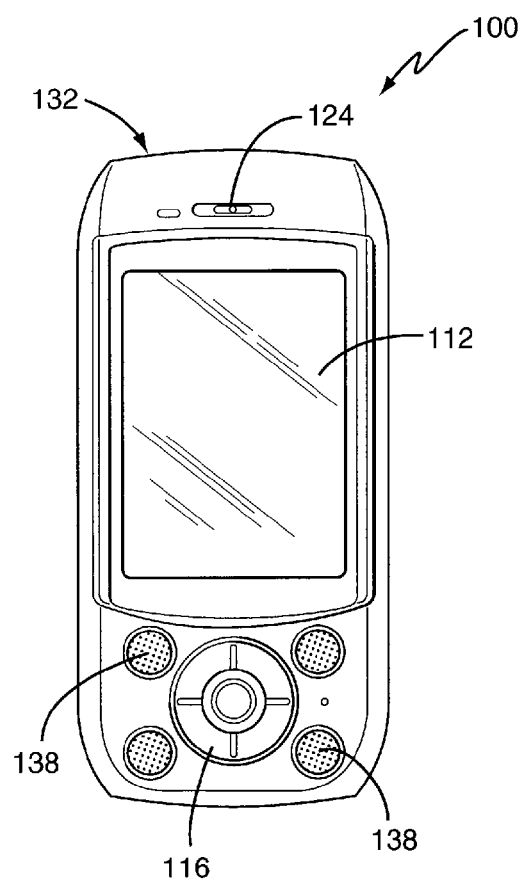
FIG. 1 is a plan view of an exemplary mobile communication device in a closed position.

Referring now to the drawings, a mobile communication device according to one exemplary embodiment of the present invention is shown therein and indicated generally by numeral 100. Mobile communication device 100 includes a housing comprising a first housing section 130 and a second housing section 132. A swivel or slide mechanism 160, shown schematically in FIGS. 3 and 4, joins the first and second housing sections 130, 132 so as to move between open and closed positions. The first and second housing sections 130, 132 may be configured to slide between the open and closed positions or to rotate between the open and closed positions. Because swivel and slide mechanisms are well-known in the art, the details of such mechanisms are omitted.

The first housing section 130 includes an obverse surface 134 that is covered in the closed position and partially exposed in the open position. Similarly, the second housing section 132 includes a reverse surface 136 (FIG. 3) that is covered in the closed position and partially exposed in the open position. In the open position, the first and second housing sections 130, 132 partially overlap so that a portion of the obverse surface 134 and a portion of the reverse surface 136 are concealed in the open position. The portions of the obverse surface 134 and reverse surface 136 that are concealed in the open position are referred to herein as protected surfaces.

Figure 2:
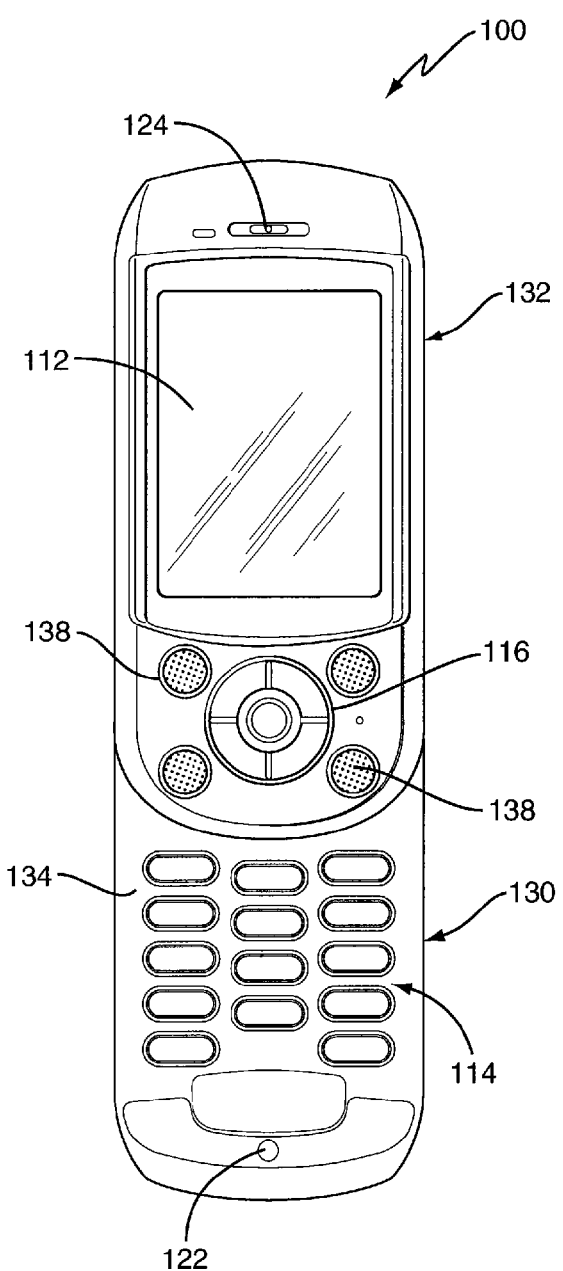
FIG. 2 is a plan view of a mobile communication device in an open position.

In the embodiment illustrated in FIGS. 1 and 2, the first housing section 130 includes a conventional numeric keypad 114 and microphone 122. The keypad 114 and microphone 122 are disposed on a portion of the obverse surface 134 that is exposed in the open position. The second housing section 132 includes a display 112, navigation control 116, and conventional piston-type speaker 124. The keypad 114, navigation control 116, and display 112 form part of the user interface 110 (FIG. 6) for interaction with the user. The display 112 displays information for viewing by the user, while the keypad 114 and navigation control 116 receive user input. The mobile communication device 100 may include other input devices 118 (FIG. 6) in addition to keypad 114 and navigation control 116. For example, the display 112 may be a touch sensitive display that is capable of receiving user input. The microphone 122 and speaker 124 enable voice communication. The second housing section 132 may include a second microphone 122' for use when the housing sections 130, 132 are in the closed position.

Figure 3:
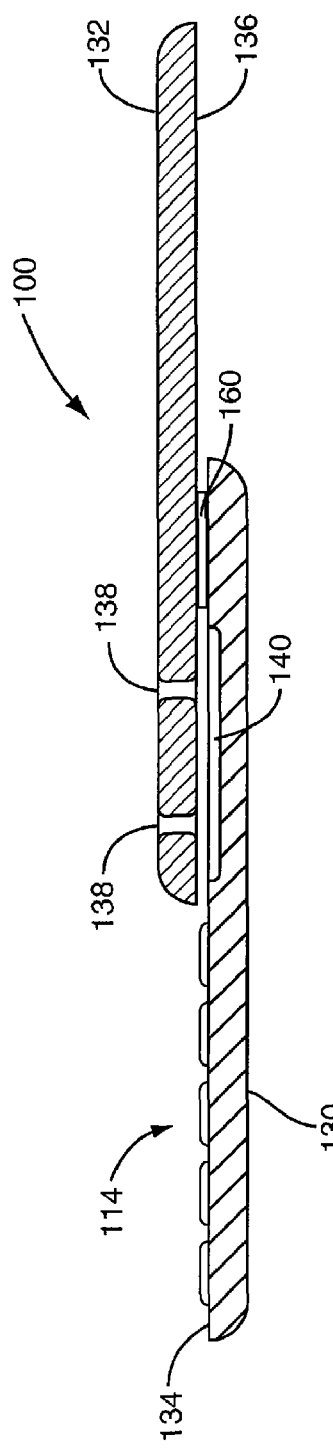
FIG. 3 is a section view of an exemplary mobile communication device in an open position.
Figure 4:
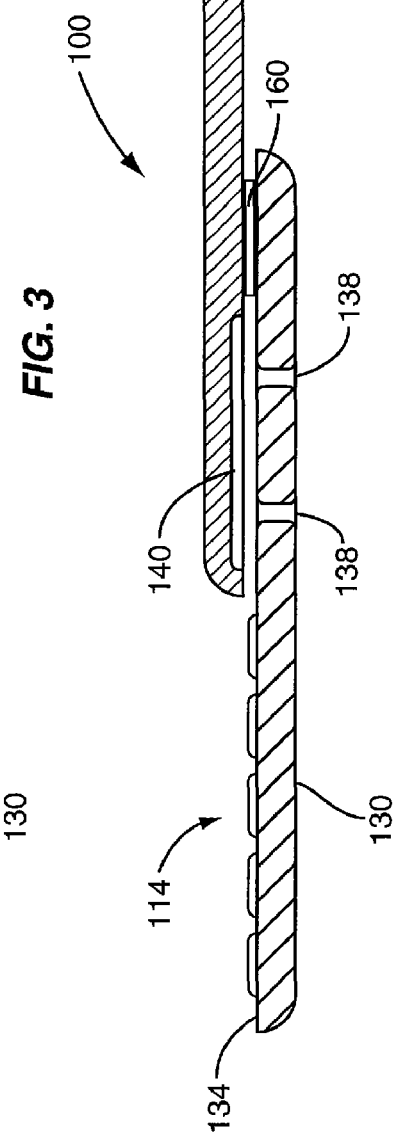
FIG. 4 is a section view of another exemplary mobile communication device in an open position.

According to one exemplary embodiment, the mobile communication device 100 further includes a distributed mode speaker 140 (FIGS. 3 and 4). The distributed mode speaker 140 is used for playing music and other audio files, and may be used for voice communications in speakerphone mode. In one embodiment, the distributed mode speaker 140 is disposed on the obverse surface 134 of the first housing section 130 (FIG. 3). More particularly, the distributed mode speaker 140 is disposed on the portion of the obverse surface 134 that is overlapped by the second housing section 132 in the open position. Thus, the second housing section 132 protects the distributed mode speaker 140 from being damaged. One or more acoustic ports 138 may be formed in the portion of the second housing section 132 that overlaps the first housing section 130. The acoustic ports 138 project sound generated by the distributed mode speaker 140. Alternatively, sound may exit from the gap between the housing sections 130, 132. Sound channels (not shown) can also be formed in the surfaces of the first and second housing sections 130, 132 to channel sound out.

FIG. 4 illustrates an alternate embodiment wherein the distributed mode speaker 140 is disposed on the reverse surface 136 of the second housing section 132. In this embodiment, the distributed mode speaker 140 is disposed on the portion of the reverse surface 136 that is overlapped by the first housing section 130 in the open position. Thus, the first housing section 130 protects the distributed mode speaker 140 in the open position. The acoustic ports 138 pass through the first housing section 130 to project sounds generated by the distributed mode speaker 140.

Figure 5:
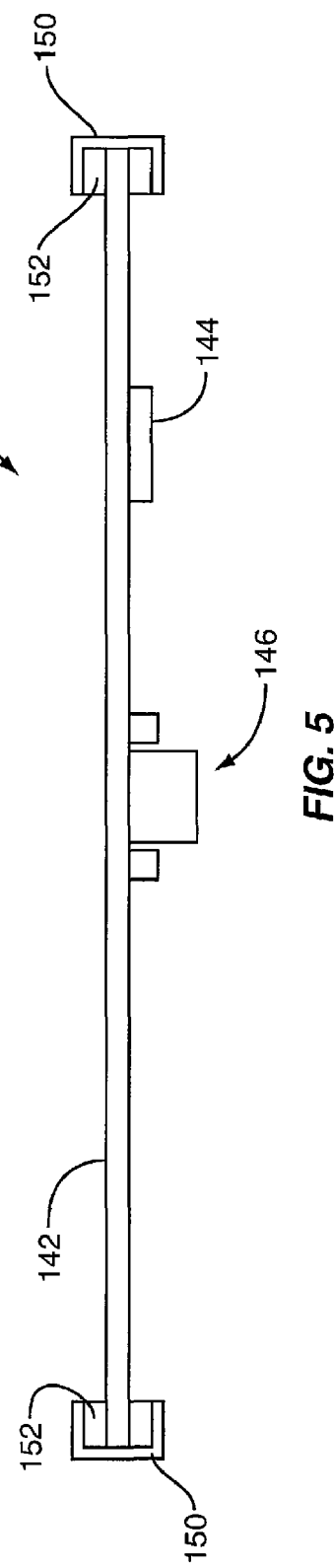
FIG. 5 illustrates the structure of an exemplary distributed mode speaker.

FIG. 5 illustrates the structural elements of an exemplary distributed mode speaker 140. The distributed mode speaker 140 comprises a speaker panel 142, and a mode transducer 144 to excite the speaker panel 142 and generate bending waves. As is known in the art, the bending waves transmitted through the speaker panel 142 produce audible sounds that can be heard by the user. Speaker panel 142 is typically a thin but stiff panel that can be constructed from a wide variety of materials. For example, speaker panel 142 may be constructed from plastics, glass fiber, carbon fiber composites, or paper. The properties of the specific material used to construct speaker panel 142, along with its dimensions, dictate the acoustical properties of speaker panel 142. For example, a certain material may be selected for speaker panel 142 to ensure audio above a given frequency. As seen in the figures, speaker panel 142 is typically flat, however, those skilled in the art will readily appreciate that panel 142 may also be curved or bent.

Mode transducer 144 excites the natural resonance of the speaker panel 142 according to an applied audio signal to produce bending waves in the speaker panel 142. Mode transducer 144 causes the speaker panel 142 to vibrate in a pseudo-random manner such that different areas of the panel 142 bend as they are independently excited with different amplitudes and phases. A wide variety of transducers may be used in the distributed mode speakers. These include, but are not limited to, piezoelectric transducers and dynamic coil transducers. Piezoelectric transducers have a thin profile that is desirable for mobile devices. However, piezoelectric transducers are delicate, and thus, may break easily if device 100 is dropped. Dynamic-coil transducers are more robust and may provide greater protection from drop damage. However, dynamic-coil transducers also have a larger profile than do piezoelectric transducers.

Mode transducer 144 may be positioned anywhere on panel 142, but is preferably positioned off-center of the panel 142. For example, mode transducer 144 may be positioned on speaker panel 142 according to NXT's "Gold" and "Silver" ratios. These ratios define the optimum distances from the edges of the speaker panel 142 to a mounting point of mode transducer 144. Symmetrical mounting of mode transducer 144 (e.g., centered on panel 142) tends to negatively affect modal excitement of the speaker panel 142, and degrades the audible output.

In some exemplary embodiments, the distributed mode speaker 140 may also function as a vibrator to generate a tactile alarm that can be felt by a user. A vibration transducer 146, such as a magnetic coil, may be mounted near the center of the speaker panel 142 to vibrate the entire speaker panel 142 at a low frequency. Those skilled in the art will appreciate that the vibration generated by the vibration transducer 146 is different in character from the vibrations produced by the mode transducer 144. More specifically, the vibration transducer 146 moves the speaker panel 142 in the same manner as a diaphragm in a conventional speaker. The bodily movement of the panel 142 produces a vibration that can be felt by the user.

The speaker panel 142 is mounted in a frame 150. The edges of the speaker panel 142 are inserted into a channel in the frame 150 and held between elastomeric damping members 152. The damping members 152 may be, for example, natural or synthetic rubber or other resilient material that allows some displacement of the speaker panel 142 when the speaker panel 142 is vibrated by the vibration transducer 146.

The frequency range of the distributed mode speaker 140 is affected by the size of the speaker panel 142. A large speaker panel 142 is capable of produced a wide frequency range. However, decreasing the size of the speaker panel 142 limits the ability of the speaker 140 to reproduce low frequencies. The distributed mode speaker 140 may be used in conjunction with a conventional woofer or sub-woofer to provide a full range of sound.

Alternatively, the speaker panel 142 of the present invention may operate as a conventional pistonic speaker at low frequencies, and as a distributed mode speaker at higher frequencies. The vibration transducer 146 may be actuated to reproduce low frequency sounds (e.g., below 100 kHz) and the mode transducer 144 may be actuated to reproduce high frequency sounds (e.g., 100 kHz or above).

Figure 6:
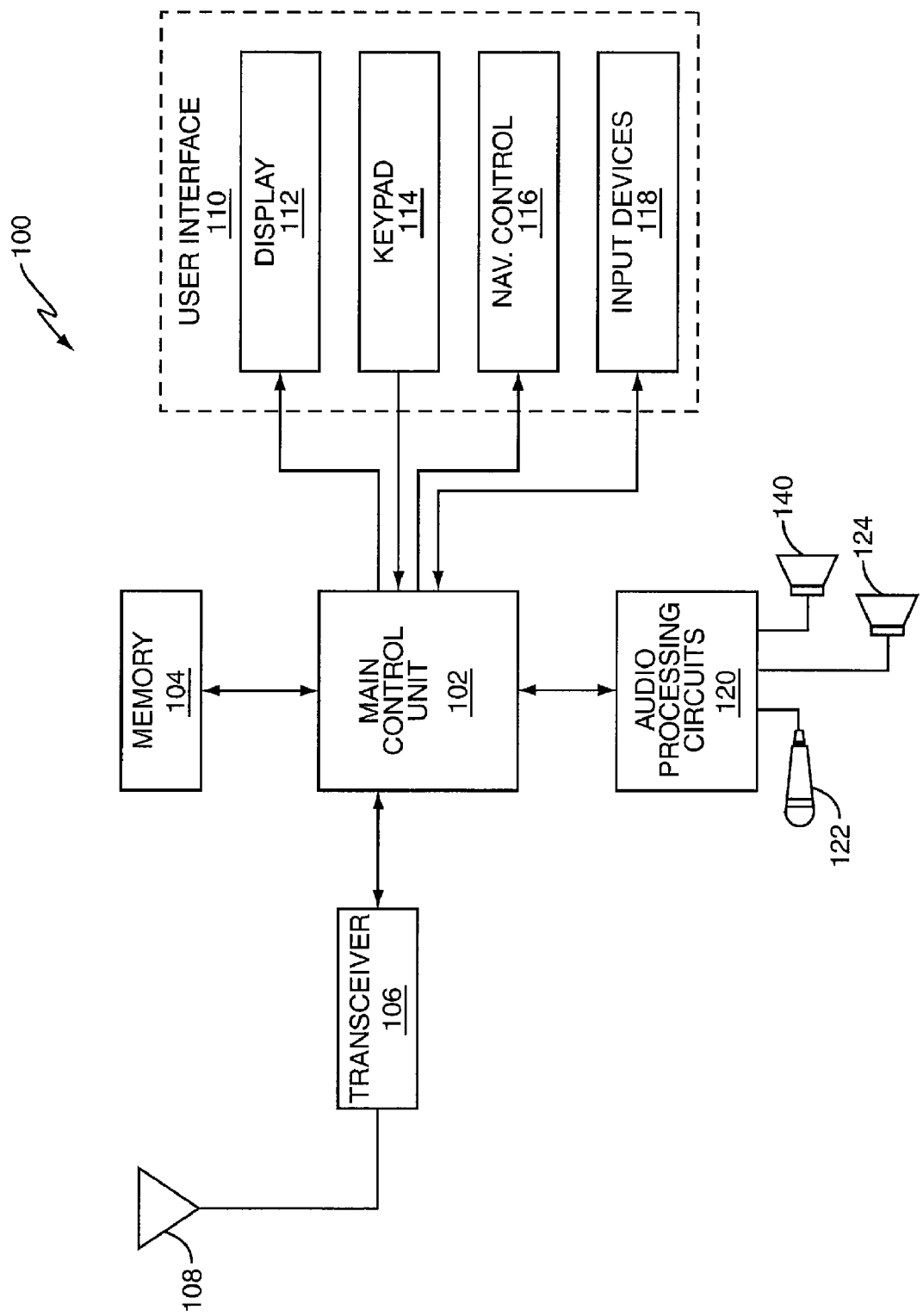
FIG. 6 illustrates the main functional components of a mobile communication device.

FIG. 6 illustrates the main components of an exemplary mobile device 100. The mobile device 100 comprises a main control unit 102, memory 104, a transceiver 106 connected to an antenna 108, user interface 110, and audio processing circuit 120. The main control unit 102 is responsible for overall operational control of the mobile device 100. The main control unit 102 may comprise one or more processors, microcontrollers, and/or hardware circuits. Memory 104 stores data and programs needed for operation. The memory 104 may comprise one or more discrete memory devices, including read-only memory, random access memory, flash memory, etc.

Transceiver 106 may comprises a conventional cellular transceiver for communicating with a mobile communication network (not shown), or may comprise a conventional WiFI transceiver. The transceiver 106 may operate according to known standards, such as GSM, WCDMA, UMTS, and OFDM.

The audio processing circuits 120 process audio signals input by microphone 122 or output to speakers 124, 140. Microphone 122 converts audible sounds into audible signals for input to the main control unit 102. Speakers 124, 140 converts audio signals into audible sounds that can be heard by the user.

User interface 110 comprises a display 112, keypad 114, navigation control 116 and possibly other input devices 118. The main control unit 102 outputs information in visual form to display 112 for viewing by the user. Keypad 114, navigation control 116, and other input devices 118 provide user input to the main control unit 102.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A mobile communication device comprising:
   first and second housing sections movably connected so as to move relative to one another between open and closed positions;
   protected surfaces located on the first and second housing sections respectively that overlap when the first and second housing sections are in the open position; and
   a distributed mode speaker disposed on the protected surface of one of the housing sections and one or more acoustic ports disposed on the other housing section, said acoustic ports arranged to project sound produced by said distributed mode speaker.

2. The mobile communication device of claim 1 wherein the first and second housing sections are connected so as to slide relative to one another between open and closed positions.

3. The mobile communication device of claim 1 wherein the distributed mode speaker is disposed on the protected surface of the first housing section.

4. The mobile communication device of claim 3 further comprising an acoustic port in the second housing section arranged to project sound produced by said distributed mode speaker.

5. The mobile communication device of claim 1 wherein the distributed mode speaker is disposed on the protected surface of the second housing section.

6. The mobile communication device of claim 5 further comprising an acoustic port in the first housing section arranged to project sound produced by said distributed mode speaker.

7. The mobile communication device of claim 1 wherein said protected surfaces overlap in both the open and closed positions.

8. A mobile communication device comprising:
   a first housing section having an obverse surface facing toward a user;
   a second housing section having a reverse surface facing away from the user;
   said first and second housing sections being slidably connected so as to slide relative to one another between open and closed positions;
   said obverse surface of said first housing section and said reverse surface of said second housing section including protected surfaces that overlap when the first and second housing sections are in the open position; and
   a distributed mode speaker located on the protected surface of said first or second housing sections, and one or more acoustic ports disposed on the other housing section arranged to project sound produced by said distributed mode speaker.

9. The mobile communication device of claim 8 wherein the distributed mode speaker is disposed on the obverse surface of the first housing section.

10. The mobile communication device of claim 9 further comprising an acoustic port in the second housing section arranged to project sound produced by said distributed mode speaker.

11. The mobile communication device of claim 8 wherein the distributed mode speaker is disposed on the reverse surface of the second housing section.

12. The mobile communication device of claim 11 further comprising an acoustic port in the first housing section arranged to project sound produced by said distributed mode speaker.

13. The mobile communication device of claim 8 wherein said protected surfaces overlap in both the open and closed positions.

* * * * *